INVENTORS
CHUICHI NAKAZAWA
HIROSHI HIRANAMI
TAKASHI KAN
YOSHIO ICHIKAWA
HACHIRO ONISHI

BY Philip Mintz

ATTORNEY

United States Patent Office 3,516,229
Patented June 23, 1970

3,516,229
DEAERATING APPARATUS
Chuichi Nakazawa, Hiroshi Hiranami, Takashi Kan, Yoshio Ichikawa, and Hachiro Onishi, Saidaiji, Japan, assignors to American Cyanamid Company, Stamford, Conn., a corporation of Maine
Filed Oct. 31, 1968, Ser. No. 772,097
Claims priority, application Japan, Nov. 15, 1967, 42/96,605
Int. Cl. B01d 19/00
U.S. Cl. 55—193    3 Claims

ABSTRACT OF THE DISCLOSURE

In deaerating apparatus comprising a tank having a suction port at the top, a viscous liquid discharge port at the bottom, a trough secured to the outer peripheral surface of said tank and having a plurality of small holes for introducing a viscous liquid thereto, distributor means establishing communication between said trough and said tank, and having a cover plate so shaped that when viscous liquid from the trough enters the tank any droplets formed by splashing of said liquid are prevented from traveling upwardly, the improvement comprising (a) a shield plate placed within the tank extending downwardly from a position adjacent the cover plate and (b) a guide plate having its upper end placed closely adjacent the inner tank wall and below the clearance between the inner tank wall and the cover plate and having its lower end placed closely adjacent the shield plate so that part of the flow of viscous liquid along the inner tank wall is transferred to the shield plate.

Figure 1:
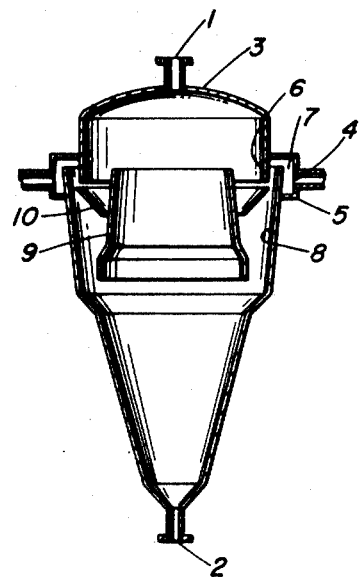

The present invention relates to an improved deaerating apparatus for continuously removing air and other gases from viscous liquids. More particularly, the present invention relates to the provision in such apparatus of baffle means comprising a shield plate and a guide plate placed therin near the inlet thereof to obtain improved performance.

Heretofore, in continuously vacuum deaerating a liquid of high viscosity, such as spinning dope used in forming fibers, the liquid is flowed onto an inner tank surface from a distributor means which is a trough into which the viscous liquid is fed and from which said liquid overflows onto the tank surface. The distributor means is provided with a cover plate positioned between the inner wall of the trough and the suction port so as to prevent splashes from the boiling liquid from flying upwardly and to enable them to flow down the inner tank wall instead. However, in effecting deaeration of viscous liquids using deaerating apparatus having this type of distributor means, it often occurs that variations in the feed rate of viscous liquid into the deaerator are necessary or that liquids of varying viscosity are employed, and as a result, various disadvantages are encountered. For example, when the rate of feed of viscous liquid is high, the clearance between the cover plate and inner tank wall is filled with the viscous liquid. Since the tank of the deaerating apparatus is under high vacuum and not all of the viscous liquid within the clearance area described above has formed as a film on the inner tank wall, air within the liquid not formed as a film can suddenly expand and cause splashing of the viscous liquid. The droplets formed by such splashing then fall rapidly down the free space in the tank. Since the deaeration effected by a vacuum deaerating apparatus is intended to take place gradually while the viscous liquid is slowly flowing as a thin film down along the inner tank wall, the rapid falling of droplets caused by splashing interferes with complete deaeration. In addition, when the rate of feed of viscous liquid is high, the amount of viscous liquid which flows down the inner tank wall is high, to such an extent that the layer of liquid formed on the inner tank wall is sufficiently thick to interfere with complete deaeration.

A further difficulty of the prior deaerating apparatus is that the viscous liquid flowing down the inner tank wall does not take the form of a uniform film but instead tends to form a pattern of vertical stripes of non-uniform thickness as layers, thus making it virtually impossible to achieve complete deaeration.

The present invention overcomes the above-mentioned disadvantages present in conventional deaerating apparatus and is characterized by the provision of a shield plate placed within the tank and extending downwardly from a position adjacent to the cover plate and, additionally, a guide plate having its upper end placed closely adjacent to the inner tank wall and below the exit of a clearance defined by the inner tank wall and the cover plate in such a manner that part of the viscous liquid exiting from the clearance defined above is guided to the shield plate. Thus, by providing the shield plate, droplets of viscous liquid produced by splashing of viscous liquid are prevented from falling down the free space of the tank and the thickness of the layer of the viscous layer forming on the inner tank wall is thinned by action of the guide plate in transferring part of the layer to the shield plate, thus improving deaeration.

The shield plate may have various shapes, such as a frustum of a cone, a cylinder, etc. By sloping the guide plate towards the shield plate to form an additional clearance area therewith equal to that formed with the inner tank wall, non-uniformity of liquid flow is further minimized. By making this slope in the form of an acute angle, it is possible to eliminate droplets which may otherwise be produced when the flow of voscous liquid is divided.

By placing the lower end of the shield plate in a position below the central region of the inner tank wall so as to be closely adjacent to the inner tank wall, the viscous liquid flowing down the shield plate can be reunited with that on the inner tank wall.

Figure 2:
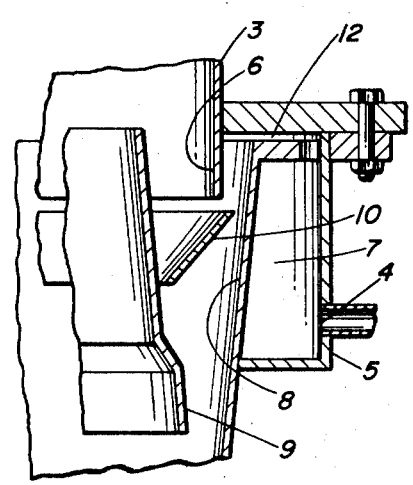
Figure 3A:
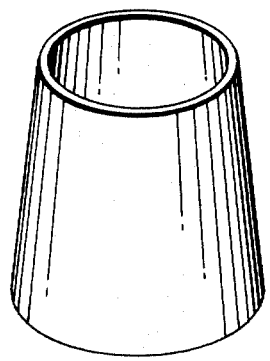
Figure 3B:
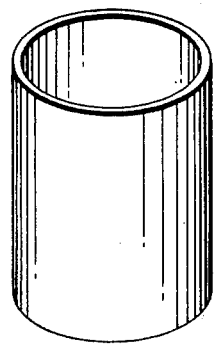

The present invention is illustrated by the drawings, in which FIG. 1 is a longitudinal sectional view of an embodiment of an apparatus according to this invention; FIG. 2 is an enlarged detail view of a pertinent portion of FIG. 1; and FIGS. 3a and 3b are perspective views, showing different embodiments of a shield plate useful in the apparatus of this invention.

As shown in FIG. 1, the deaerating apparatus to which the present invention relates comprises a tank 3 provided with a suction port 1 at the top which is connected to a vacuum pump (not shown), a viscous liquid discharge port 2 at the bottom, a trough 5 surrounding said tank having a plurality of small holes 4 for introducing the viscous liquid to be deaerated, and distributor means 7 establishing communication between said trough and the interior of said tank. The tank is provided with a cover plate 6 shaped so that when the viscous liquid within the trough enters the tank any splashes accompanying said entry are prevented from flying upwardly.

In accordance with the present invention, such deaerating apparatus is provided with a shield plate 9 placed within the tank such that it extends downwardly from a position adjacent to the cover plate 6, and with a guide plate 10 located so its upper end is placed closely adjacent the inner tank wall 8 below the distributor opening 7 defined by the inner tank wall 8 and the cover plate 6 (so that the thickness of the layer of viscous liquid forming on the inner tank wall 8 is thinned by action of the guide plate 10 in transferring part of the layer to the shield plate 9) and so its lower end is placed closely adjacent the shield plate 9 (so the layer of viscous liquid leaving shield plate 9 is smoothly transferred back to inner tank wall 8).

FIG. 2 shows in greater detail the manner in which the shield plate 9 and the guide plate 10 operate in conjunction with the cover plate 6 and distributor means 7. This figure also shows the manner of mounting the trough 5 to the tank 3 and also shows an alternative embodiment of the apparatus wherein an additional channel 12 formed by partially closing the upper portion of trough 5 communicates with the distributor means 7.

FIGS. 3a and 3b show alternative shapes for the shield plate 9. FIG. 3a shows the shield plate in the form of a frustum of a cone and FIG. 3b shows the plate as a cylinder. Thus, the shield plate is circular in cross-section at any point along its height but its base and top do not need to be of identical dimensions. When the shield plate is tapered, its base should be of larger diameter than its top.

Thus, in accordance with the present invention, there is provided apparatus for deaerating viscous liquids under vacuum wherein baffle means are provided to (a) inhibit splashing when the viscous liquids are first exposed to the vacuum, (b) prevent droplets from falling freely to the bottom of the deaerator tank, and (c) provide a uniform thin film flowing down the tank walls.

We claim:

1. In deaerating apparatus comprising a tank having a suction port at the top, a viscous liquid discharge port at the bottom, a trough secured to the outer peripheral surface of said tank and having a plurality of small holes for introducing a viscous liquid thereto, distributor means establishing communication between said trough and said tank, and having a cover plate so shaped that when viscous liquid from the trough enters the tank any droplets formed by splashing of said liquid are prevented from traveling upwardly, the improvement comprising (a) a shield plate placed within the tank extending downwardly from a position adjacent to but above the bottom edge of the cover plate and (b) a guide plate surrounding said shield plate and disposed in the space between said shield plate and said inner tank wall and having its upper end placed closely adjacent the inner tank wall and immediately below the clearance between the inner tank wall and the cover plate and having its lower end placed closely adjacent the shield plate so that part of the flow of viscous liquid along the inner tank wall is transferred to the shield plate.

2. Apparatus as defined in claim 1 wherein said tank, said shield plate, and said guide plate all have circular cross-sections, with said guide plate having a generally frustoconical configuration.

3. Apparatus as defined in claim 2 wherein said shield plate has a generally frustoconical configuration.

References Cited

UNITED STATES PATENTS

| 2,041,059 | 5/1936 | French | 55—193 |
| 2,971,603 | 2/1961 | Schmitz | 55—190 |
| 3,368,330 | 2/1968 | Elliott et al. | 55—206 X |

REUBEN FRIEDMAN, Primary Examiner

R. W. BURKS, Assistant Examiner

U.S. Cl. X.R.

55—201